United States Patent
Barth et al.

(10) Patent No.: US 8,046,442 B2
(45) Date of Patent: Oct. 25, 2011

(54) METHOD, A DEVICE FOR CONFIGURING AT LEAST ONE FIREWALL AND A SYSTEM COMPRISING SUCH DEVICE

(75) Inventors: Antje Barth, Tübingen (DE); Georg Carle, Tübingen (DE); Ali Fessi, Tübingen (DE); Marc Fouquet, Tübingen (DE); Morten Schläger, Berlin (DE)

(73) Assignee: Nokia Siemens Networks GmbH & Co., Munich (DE)

( * ) Notice: Subject to any disclaimer, the term of this patent is extended or adjusted under 35 U.S.C. 154(b) by 409 days.

(21) Appl. No.: 12/076,002

(22) Filed: Mar. 12, 2008

(65) Prior Publication Data

US 2008/0229088 A1  Sep. 18, 2008

(30) Foreign Application Priority Data

Mar. 12, 2007  (EP) ..................... 07005078

(51) Int. Cl.
*G06F 15/177* (2006.01)

(52) U.S. Cl. ......... 709/220; 709/221; 709/222; 709/226

(58) Field of Classification Search .................. 709/220, 709/221, 222, 226
See application file for complete search history.

(56) References Cited

U.S. PATENT DOCUMENTS

| | | | |
|---|---|---|---|
| 6,212,558 B1 * | 4/2001 | Antur et al. | 709/221 |
| 7,284,267 B1 * | 10/2007 | McArdle et al. | 726/11 |
| 7,543,331 B2 * | 6/2009 | Saltz | 726/11 |
| 2005/0135241 A1 | 6/2005 | Hippelainen | |
| 2005/0165917 A1 | 7/2005 | Faccin et al. | |
| 2006/0195897 A1 | 8/2006 | Momose et al. | |
| 2006/0253900 A1 * | 11/2006 | Paddon et al. | 726/11 |
| 2007/0067838 A1 * | 3/2007 | Bajko | 726/11 |
| 2007/0218903 A1 * | 9/2007 | Grech | 455/436 |
| 2007/0281699 A1 * | 12/2007 | Rasanen | 455/436 |

OTHER PUBLICATIONS

C. Perkins; IP Mobility Support for IPv4; RFC 3344; Aug. 2002.
3GPP; TR 23.882 V1.6.1 (Nov. 2006) 3$^{rd}$ Generation Partnership Project; Technical Specification Group Services and System Aspects; 3GPP System Architecture Evolution: Report on Technical Options and Conclusions (Release 7).
Gopal, Ram L. et al., User Plane Firewall for 3G Mobile Network; XP010701756 pp. 2117-2121.
Johnson, D., Mobility Support in IPv6; RFC 3775; Jun. 2004.

* cited by examiner

*Primary Examiner* — Kenny Lin
(74) *Attorney, Agent, or Firm* — Squire, Sanders & Dempsey (US) LLP (57) ABSTRACT

A method and a device to configure at least one firewall are provided comprising the steps of (i) transmitting at least one mobility report to a firewall controller; (ii) transmitting at least one session report to the firewall controller; and (iii) configuring the at least one firewall according to the information obtained by the at least one mobility report and by the at least one session report.

23 Claims, 9 Drawing Sheets

METHOD, A DEVICE FOR CONFIGURING AT LEAST ONE FIREWALL AND A SYSTEM COMPRISING SUCH DEVICE

REFERENCE TO RELATED APPLICATIONS

This application claims priority under 35 U.S.C. §119 to European Patent Application No. EP07005078 filed Mar. 12, 2007 in Europe. The subject matter of the earlier filed application is hereby incorporated by reference.

BACKGROUND OF THE INVENTION

1. Field of the Invention

The invention relates to a method and a device for configuring at least one firewall as well as to a system comprising such device.

2. Description of the Related Art

Firewalls will be deployed in the third generation of mobile phone standards (3G) and beyond networks at various places for protection against attacks and for access control to define which host is permitted to use certain services or applications. Possible locations for firewalls are:

At the changeover point between radio access networks and an IP-based packet core,
inside the packet core network to make attacks more difficult (detection of distributed attacks),
at administrative borders between two operators,
at the entry point of an IP Multimedia Subsystem (IMS), and
towards the public Internet.

The most common type of firewall is a packet filter that permits traffic flow identified by the IP-5tuple: source address and port number, destination address and port number, and the higher-layer protocol (usually TCP or UDP).

Such packet filters are implemented in a Gateway GPRS Support Node (GGSN) of today's 2.5G and 3G networks, they are used for filtering based on Traffic Flow Templates (TFT, see 3GPP TS23.060) or Service-based Local Policy (SBLP, see 3GPP TS29.207).

For policy control in the IP Multimedia Subsystem (IMS), a Policy Decision Function (PDF) entity has been specified; the corresponding Policy Enforcement Function (PEF) is located in the Gateway GPRS Support Node (GGSN) (see 3GPP TS23.228). Lately, this Policy Enforcement Function (PEF) has been changed to a Policy and Charging Control (PCC) architecture which will unify the previously systems for policy and charging control (see 3GPP TS23.203).

In this new architecture the tasks of a Policy Decision Function (PDF) will be carried out by a Policy and Charging Rules Function (PRCF), the Policy Enforcement Function (PEF) will be included in a Policy and Charging Enforcement Function (PCEF), which is still located inside the Gateway GPRS Support Node (GGSN) or an equivalent network entity, for example a System Architecture Evolution (SAE) Mobility Management Entity and User Plane Entity (MME/UPE) or a Wireless LAN Packet Data Gateway (WLAN PDG).

Currently, the 3GPP standardizes a network architecture labeled "System Architecture Evolution" (see 3GPP TR23.882) which can use access networks like WLAN (see 3GPP TS23.234) and the Long-Term Evolution 3GPP Radio Access Network (LTE, see 3GPP TR25.913). For such architecture, a Mobile IP Home Agent (HA) is considered as an Inter Access System Anchor Point (IASA, see, e.g., 3GPP TR23.882 V1.6.1, FIG. 4-2.1).

Mobility support for IPv4 has been standardized by the IETF as RFC3344, mobility support for IPv6 is defined in RFC 3775. With a mobility-solution based on Mobile IP, the User Equipment UE would assume the role of the Mobile Node (MN) and therefore it would have two IP-Addresses, a Home Address (HoA) and a Care-of Address (CoA) which reflects the Mobile Node's (MN) current position in the network and can therefore change when a handover occurs.

Packets from a Correspondent Node (CN) are sent to the Home Address (HoA) and are routed to the Mobile Node's (MN) Home Network. There, a Home Agent (HA) receives the packets and tunnels them to the Mobile Node's (MN) current Care-of Address (CoA). After a Mobile IP (MIP)-handover, the Home Agent (HA) must be informed about the Mobile Node's (MN) new Care-of Address (CoA), Binding Update messages are used for this purpose.

An improvement of Mobile IP is called Route Optimization (RO) (see 3GPP TR.23.882). When it is activated, the Mobile Node (MN) also sends Binding Updates to the Correspondent Node (CN), which can therefore send data directly to the Mobile Node (MN) without having it routed through the Home Agent (HA). Even with Route Optimization, it is still necessary to have a Home Agent (HA) available which knows the Mobile Node's (MN) Care-of Address (CoA) as new Correspondent Nodes (CN) that may want to contact the Mobile Node (MN) are not aware of the current Care-of Address (CoA) yet.

Packets from the Mobile Node (MN) to the Correspondent Node (CN) are usually not sent via the Home Agent (HA), instead they are sent the direct way thereby improving performance. However, routing via the Home Agent (HA) is also possible and referred to as Reverse Tunneling.

There are a number of differences between Mobile IPv4 and Mobile IPv6. Mobile IPv4 uses a Foreign Agent in the foreign network and may tunnel packets on the direct way between the Mobile Node (MN) and the Correspondent Node (CN). Mobile IPv6 does not need a Foreign Agent and can use Header Options instead of tunnels for direct communication between the Mobile Node (MN) and the Correspondent Node (CN).

Problems arise when a mobile IP (MIP)-handover occurs in a System Architecture Evolution (SAE) network:

Since the data path (or a segment of it) changes the data traffic crosses packet filters that have not been configured, The traffic end points (IP addresses) change. Therefore, even if a segment of the data path remains the same, firewalls on this segment are not configured to appropriately forward traffic.

Figure 1:
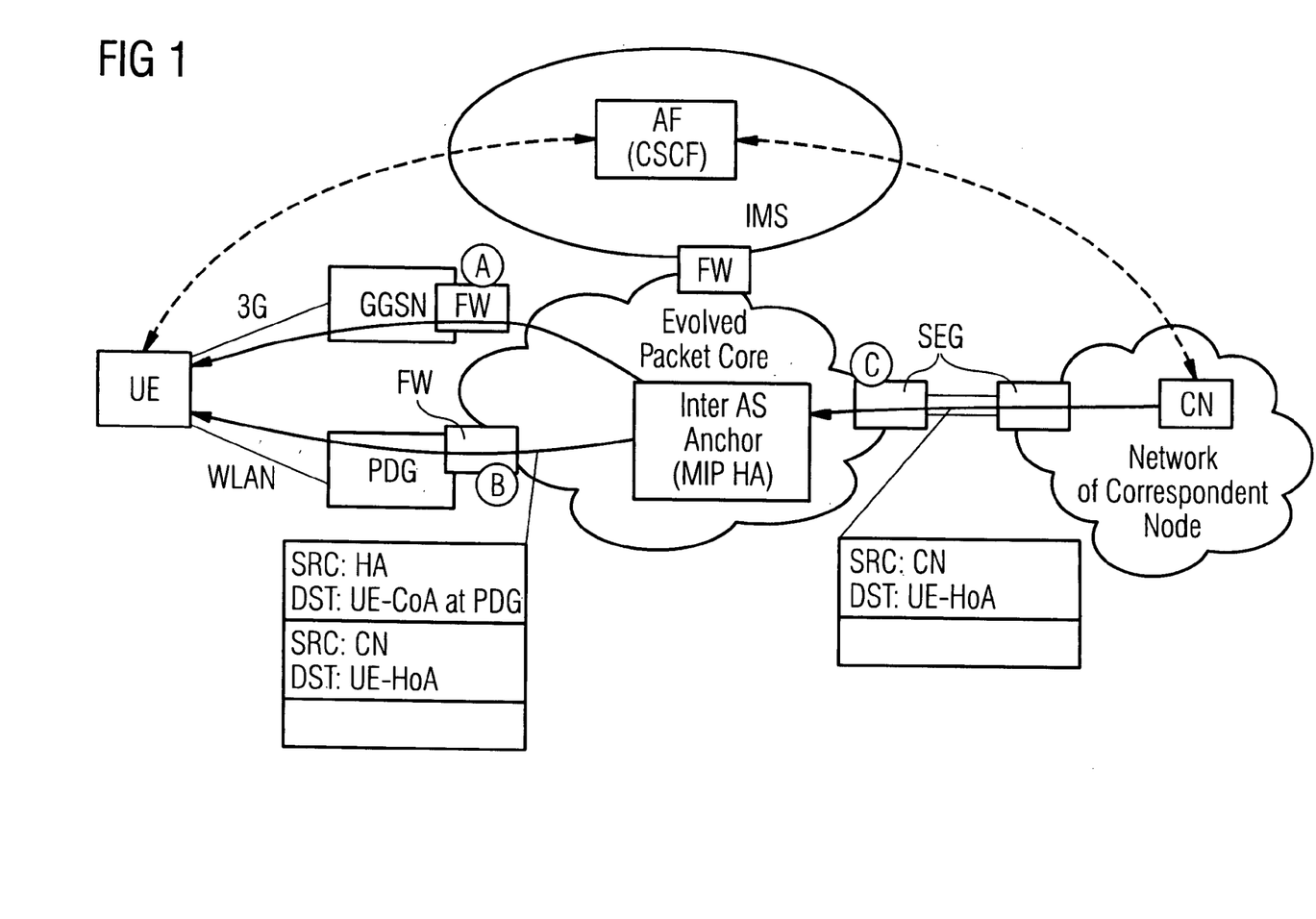
FIG. 1 shows a network topology with two Radio Access Networks (RANs), an IP Multimedia Subsystem IMS and a Mobile IP Home Agent.

Reference is made to FIG. 1 showing a network topology with two Radio Access Networks (RANs), an IP Multimedia Subsystem IMS and a Mobile IP Home Agent.

FIG. 1 comprises a User Equipment UE that is logically connected to an Application Function AF (in particular a Call Session Control Function CSCF) of the IP Multimedia Subsystem IMS for signaling purposes. A Correspondent Node CN in another network is also logically connected to the Application Function AF (in particular the Call Session Control Function CSCF) of the IP Multimedia Subsystem IMS for signaling purposes. The communication between the User Equipment UE and the Application Function AF as well as between the Application Function AF and the Correspondent Node CN, may be performed using the Session Initiation Protocol SIP.

The traffic of the User Equipment UE may be routed through a 3G connection to a Gateway GPRS Support Node GGSN that is further connected via a Firewall FW with an Inter Access System Anchor (IASA) (in particular a Mobile IP Home Agent MIP HA) of an Evolved Packet Core network. Alternatively, the User Equipment UE may be connected via a Wireless LAN WLAN to a Packet Data Gateway PDG that is further connected via a Firewall FW to the Inter Access System (AS) Anchor (in particular the Mobile IP Home Agent MIP HA) of the Evolved Packet Core network.

The Evolved Packet Core network is connected to the IP Multimedia Subsystem IMS via an additional Firewall FW.

The Inter Access System Anchor (IASA) (in particular the Mobile IP Home Agent MIP HA) of the Evolved Packet Core network can be reached from the Correspondent Node CN via a Security Gateway SEG of the network of the Correspondent Node that is connected to another Security Gateway SEG of the Evolved Packet Core network.

At an initial state, the User Equipment UE is attached to the first Radio Access Network RAN. All firewalls are configured to allow the User Equipment UE to send signaling-traffic to the IP Multimedia Subsystem IMS.

1. The User Equipment UE initiates a session, e.g., by sending an SIP INVITE message to the Application Function AF.
2. The Application Function AF forwards the INVITE message to the Correspondent Node CN. The Application Function AF also triggers packet filter rules to be set by the Policy Control and Charging Rules Function PCRF in the Policy Charging Enforcement Function PCEF located at the Gateway GPRS Support Node GGSN (reference A in FIG. 1) to permit the traffic for this session. Currently, it is open how the firewall at "C" in FIG. 1 will be configured to allow this session.
3. The session starts. The Correspondent Node CN sends traffic to the User Equipment's UE Home Address. The packets reach the Inter Access System AS Anchor which acts as a Mobile IP Home Agent MIP HA and tunnels the packets to the User Equipment UE.

During the session the User Equipment UE makes a handover to Radio Access Network RAN 2 using Mobile IP. The User Equipment UE now has a new Care-of Address which is used as the destination address in all traffic from the Home Agent HA to the User Equipment UE and as the source address for all traffic originating at the User Equipment UE. Traffic that flows between the User Equipment UE and the Access System AS will be blocked by the Policy Charging Enforcement Function PCEF at the I-WLAN Packet Data Gateway PDG (see reference B in FIG. 1), because there is no packet filter rule for this flow configured at said reference B.

If traffic from the User Equipment UE to the Correspondent Node CN was not blocked at B, it would still be blocked at C, as the traffic appears with a new source address there (the new Care-of Address CoA after the handover).

Figure 2:
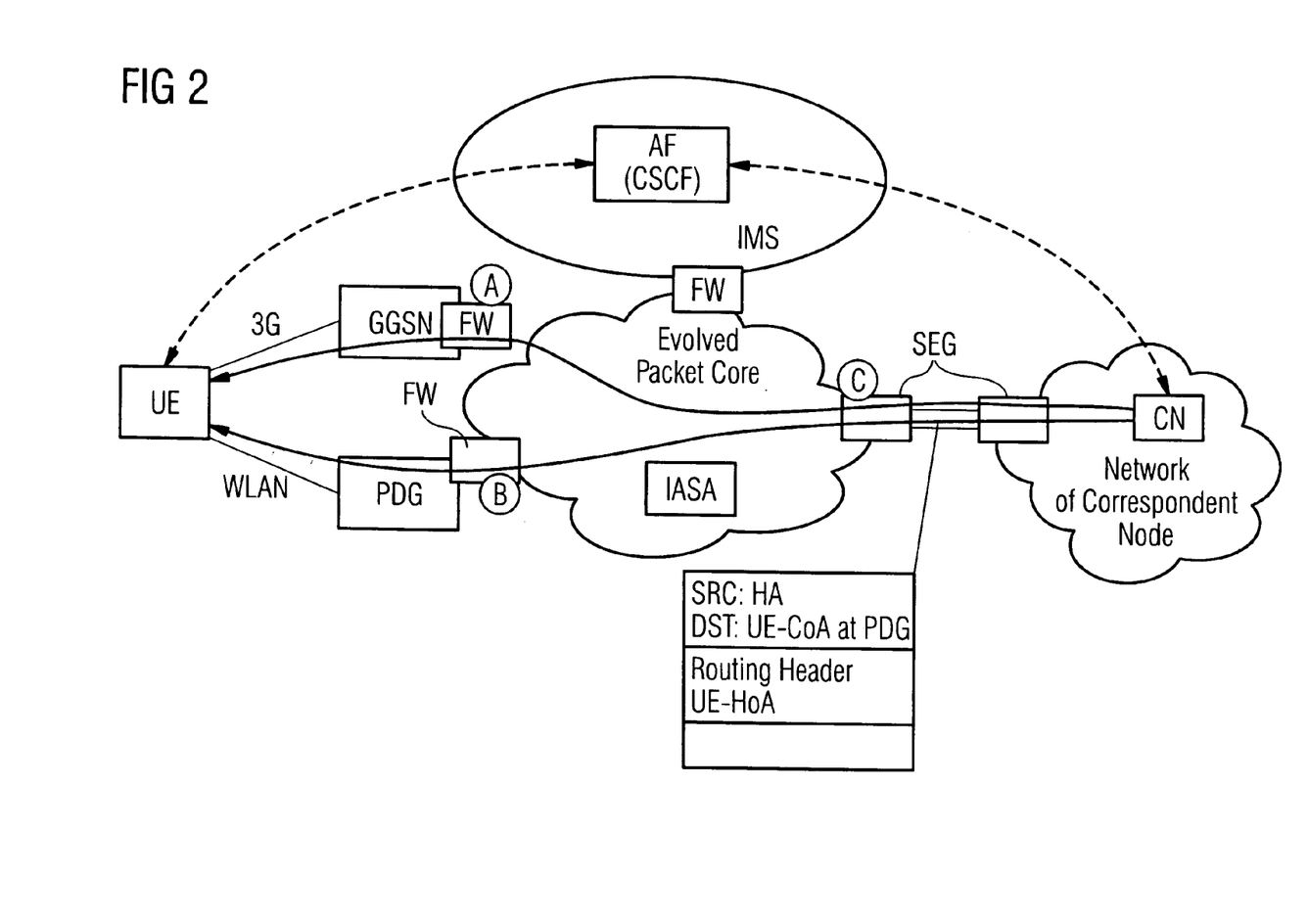
FIG. 2 shows the network topology with Route Optimization activated.

FIG. 2 shows the same situation with Route Optimization activated. After the handover, the packets from the Correspondent Node CN to the User Equipment UE would also be blocked already at reference C as they appear with a new destination address. Again there is no packet filter rule configured for this IP 5-tuple.

The knowledge for the required configuration changes is distributed at several locations in the network.

the Application Function AF (i.e. Proxy Call Session Control Function P-CSCF) knows which sessions are active, but it does not know about the changed Care-of Address CoA;

the Home Agent HA knows about the new Care-of Address CoA, but it does not know about the active sessions as it does not process SIP signaling traffic.

Note that the Security Gateway SEG in the Correspondent Nodes CN network will also have to be configured in FIG. 1 and in FIG. 2.

So far, the Gateway GPRS Support Node GGSN has been the anchor point for mobility in 3GPP networks. As this point has never changed and as the Gateway GPRS Support Node GGSN is the location of the packet filter towards the user, mobility information has not been required to determine the correct packet filter rules.

Dynamic IP packet filter configuration in security gateways at the changeover points between operator networks has not been touched by 3GPP.

SUMMARY OF THE INVENTION

The object to be solved is to overcome the disadvantage cited above and to allow legitimate traffic to be routed dynamically trough a network that is protected by at least one firewall.

This problem is solved according to the features of the independent claims. Further embodiments result from the depending claims.

In order to overcome this problem a method to configure at least one firewall is provided comprising the steps:
 transmitting at least one mobility report to a firewall controller;
 transmitting at least one session report to the firewall controller;
 configuring the at least one firewall according to the information obtained by the at least one mobility report and by the at least one session report.

Said configuration of the firewall may comprise updating, adding, deleting or modifying policies of the firewall.

It is to be noted that firewall refers to any component (or part of a component) in a communication system that may comprise a firewall functionality. Hence, also gateways, e.g., security gateways, may be considered as firewalls in this regard.

It is to be further noted that the order of the reports transmitted and/or received does not matter, i.e. either the mobility report is first transmitted to and/or received by the firewall controller or the session report is first transmitted to and/or received by the firewall controller.

Hence, upon the information received by the mobility report and the session report the firewall can be configured, e.g., updated or set up, for legitimate traffic to be routed through said firewall. If, e.g., a mobile terminal performs a handover from one network to another, the respective information of the communication channel (session) is obtained by the session report whereas the change of the network is obtained by the mobility report. Hence, the firewall controller can update the firewalls affected by this new session.

It is an embodiment that the at least one firewall is configured by adding, removing or modifying at least one firewall rule.

In another embodiment, the firewall controller receives the at least one mobility report from an Inter Access System Anchor (IASA).

In a further embodiment, the at least one mobility report provides information relating to the location and/or the type of access of a terminal. Said terminal can be a mobile terminal, e.g., a mobile phone or a personal digital assistant (PDA) or a laptop computer with a radio interface. In particular, the terminal can be a User Equipment (UE).

As an embodiment, the at least one mobility report comprises information due to roaming of a terminal.

In yet another embodiment, the at least one session report provides information about a new session, in particular a new connection between two network components of the communication network. Preferably, the at least one session report may contain information due to roaming of a terminal.

It is a next embodiment that the firewall controller receives the at least one session report from an application function of the communication network, in particular from a Call Session Control Function (CSCF), which may be part of an Application Function (AF) within an IP Multimedia Subsystem (IMS) and thereby used as a logical channel for conveying signaling information.

As another embodiment, the at least one firewall is part of a 3GPP access gateway, in particular a GGSN and/or a WLAN access gateway. Furthermore, the at least one firewall can be part of a 3GPP security gateway.

In a further embodiment, the steps described herein can be performed by the firewall controller. Said firewall controller can be a network component comprising a firewall controller functionality.

In a next embodiment, the firewall controller or its mere firewall controller functionality may be part of or associated with a Policy Control and Charging Rules Function (PCRF).

This advantageously allows an easy implementation of the approach described herein within an existing component of the communication network, here the Policy Control and Charging Rules Function (PCRF).

The problem as states supra is also solved by a device for configuring at least one firewall comprising a processor unit that is equipped or arranged such that the steps of the method as described herein can be run on said processor.

The device may be a network component, in particular a communication device, in particular a firewall controller. Preferably, the device can be associated with or be part of a Policy Control and Charging Rules Function (PCRF).

The problem is also solved by a communication system comprising a device as described herein.

DETAILED DESCRIPTION OF THE PREFERRED EMBODIMENTS

Figure 3A:
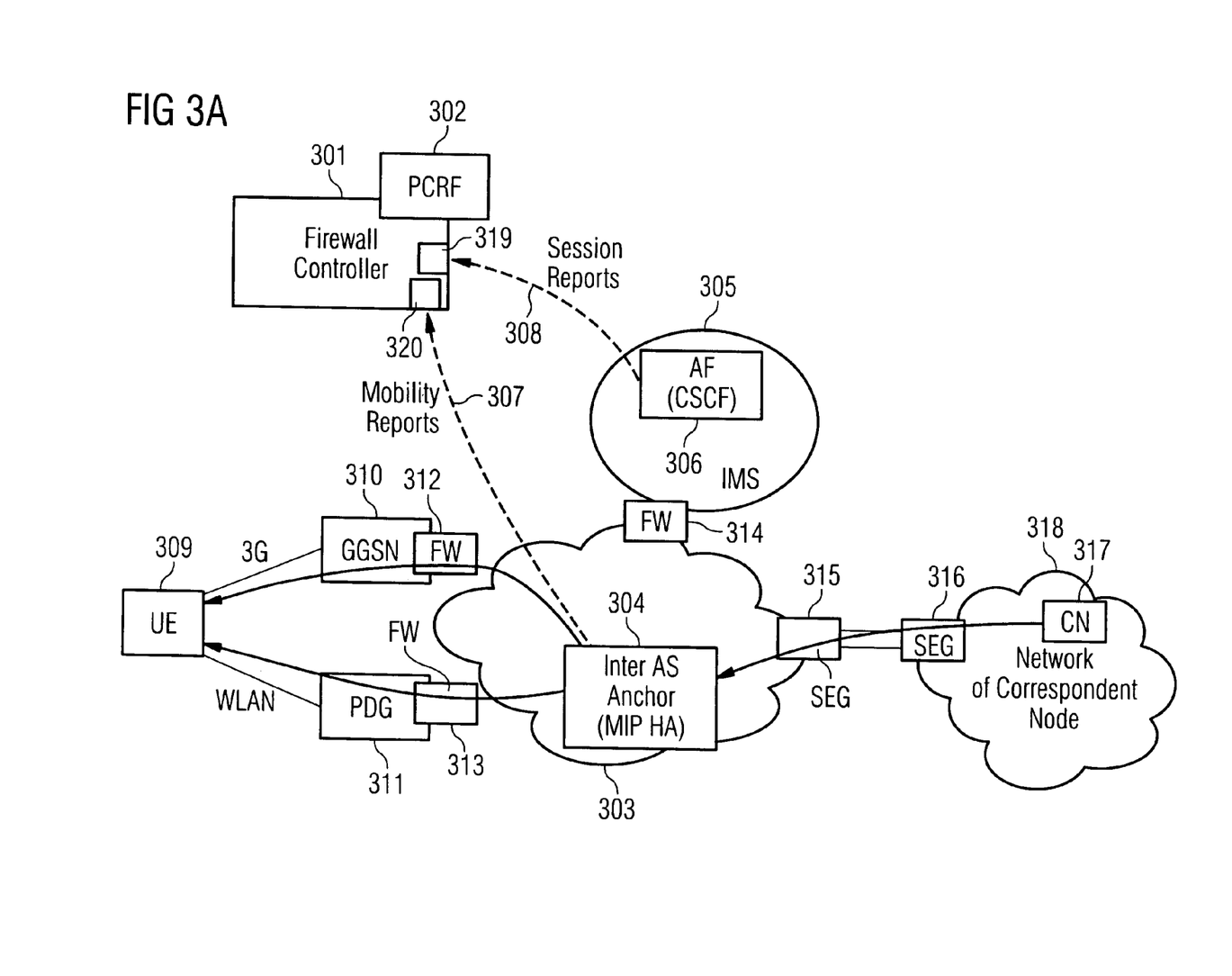
FIG. 3A shows a Firewall Controller in a network structure receiving reports from network entities.

With reference to FIG. 3A, a Firewall Controller 301 is shown that receives reports from network entities.

The Firewall Controller 301 is associated with a Policy Control and Charging Rules Function PCRF 302.

A User Equipment UE 309 can be connected via a 3G Interface to a Gateway GPRS Support Node GGSN 310 that is further connected via a firewall FW 312 with a network 303, in particular with an Inter Access System (AS) Anchor (in particular the Mobile IP Home Agent MIP HA) 304. The User Equipment UE 309 can also be connected via a Wireless LAN WLAN interface to a Packet Data Gateway PDG 311 that is further connected via a firewall FW 313 to the Inter Access System (AS) Anchor (in particular the Mobile IP Home Agent MIP HA) 304 of the network 303.

The Inter Access System (AS) Anchor 304 of the network 303 can be reached from a Correspondent Node CN 317 that is located in a respective network 318 via a Security Gateway SEG 316 of this network 318 that is further connected to a Security Gateway SEG 315 of the network 303.

The network 303 is via a firewall 314 connected with a IP Multimedia Subsystem IMS 305 comprising an Application Function AF (in particular a Call Session Control Function CSCF) 306.

The Inter Access System (AS) Anchor 304 of the network 303 can send Mobility Reports 307 and the Application Function AF 306 of the IP Multimedia Subsystem IMS 305 can send Session Reports 308 to the Firewall Controller 301.

The Firewall Controller 301 can be used to configure firewalls of the communication system.

The Firewall Controller 301 has external interfaces, in particular one interface to the IASA, one interface to the Application Function AF and one or more interfaces to the firewalls to be configured. In FIG. 3A, an interface 319 is shown that is directed to the Application Function AF 306 over which the Firewall Controller 301 is informed about sessions (e.g. start/stop of a session) between network components (here in FIG. 3A between User Equipment UE 309 and Correspondent Node CN 317). Another interface 320 is directed from the Inter Access System (AS) Anchor 304 (also referred to as "IASA"), e.g., an (mobile) IP Home Agent (MIP HA) to the Firewall Controller 301, thereby the Firewall Controller is informed about mobility events.

Preferably, a Mobility Reporting Protocol and a Session Reporting Protocol are determined. Whenever the Firewall Controller 301 receives a message on one of its interfaces 319 or 320, it determines the firewalls affected and sends appropriate configuration commands to those firewalls.

The Firewall Controller 301 could be co-located with the Policy Control and Charging Rules Function PCRF 302, which may already know as how to open sessions for the purpose of Quality of Service (QoS) and/or Charging Control.

FIG. 3A shows an operation of the Firewall Controller 301. The Firewall Controller 301 is informed by the Application Function AF 306 about the sessions that are currently active, as the Firewall Controller 301 is co-located with the Policy Control and Charging Rules Function PCRF 302, which already receives this information from the Application Function AF 306 over an Rx reference point.

The Firewall Controller 301 is also informed by the Inter Access System Anchor (IASA) about the current location of the User Equipment UE whenever a Mobile IP handover has occurred.

Figure 3B:
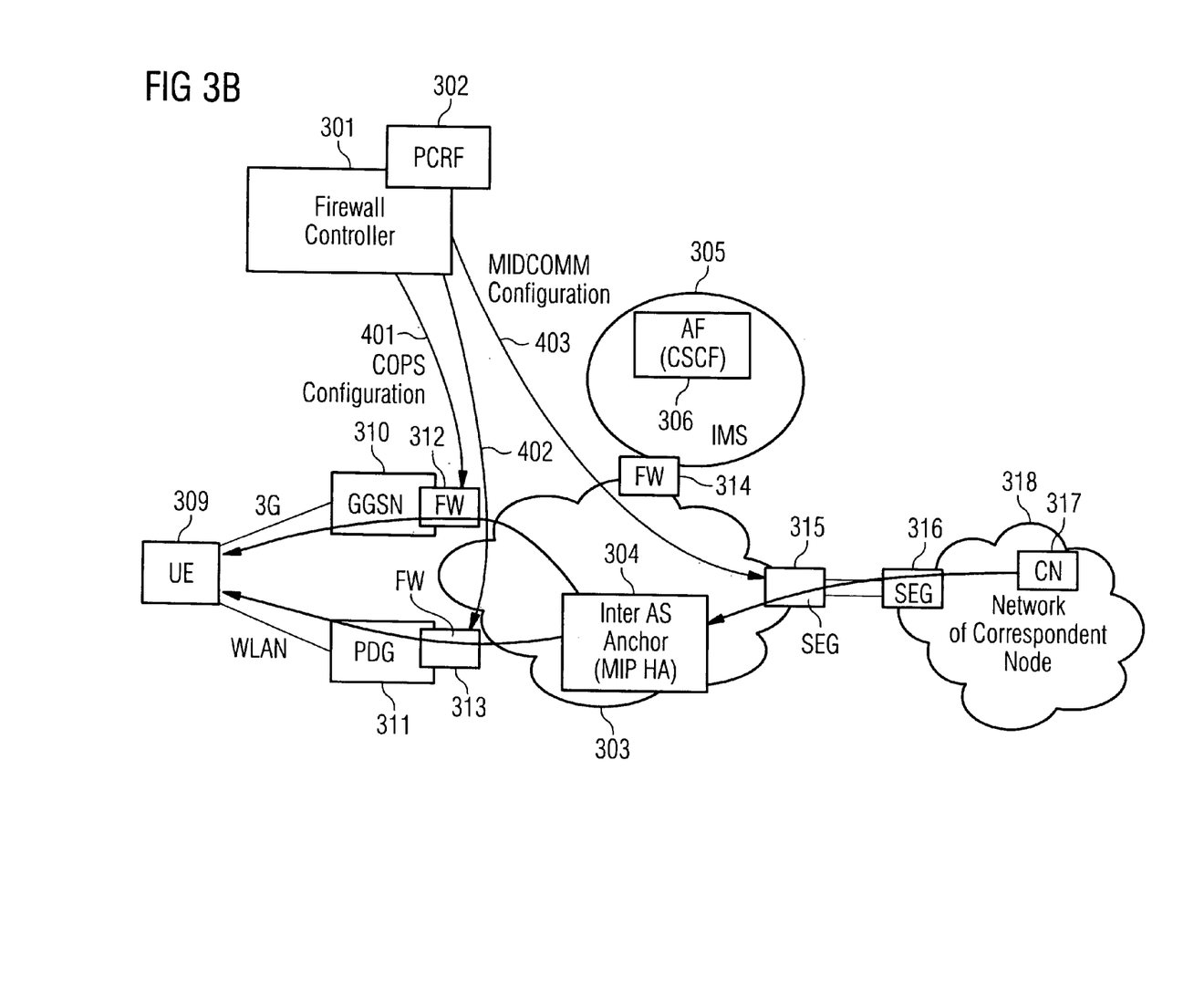
FIG. 3B shows a Firewall Controller in a network structure configuring firewalls.

FIG. 3B shows the messages sent by the Firewall Controller 301 in order to configured the firewalls affected. FIG. 3B corresponds to FIG. 3A, same references refer to similar elements.

In addition to FIG. 3A, FIG. 3B comprises three communication paths that lead from the Firewall Controller 301 to the Firewall FW 312, to the Firewall FW 313 and to the Security Gateway SEG 315. Each such communication path indicates that the Firewall Controller 301 updates the affected Firewalls/Security Gateway such that legitimate traffic can flow between the User Equipment 309 and the Correspondent Node CN 318 even after a handover of the User Equipment 309 from the associated 3G interface to the WLAN interface.

Figure 4:
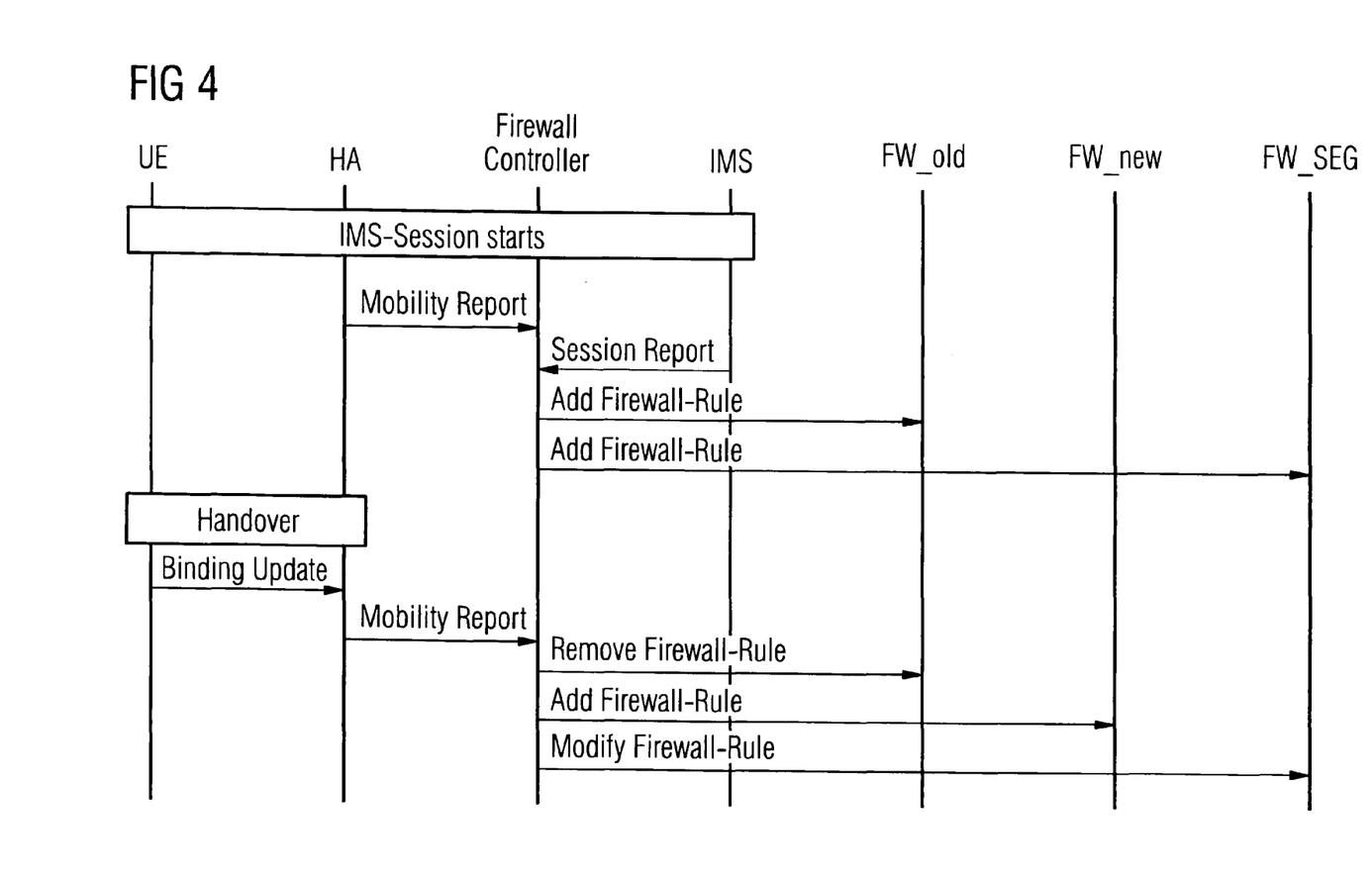
FIG. 4 shows a signaling graph comprising messages sent by a Firewall Controller in order to configure several firewalls.

FIG. 4 shows the signaling scheme according to FIG. 3B. For explanation purpose, only basic signaling is visualized. An extended signaling may comprise additional acknowledge-messages.

In FIG. 4 signaling between the User Equipment UE, the Home Agent (corresponding to the Inter Access System (AS) Anchor 304 in FIG. 3A and FIG. 3B), the Firewall Controller, the IP Multimedia Subsystem IMS (corresponding to the Application Function AF 306 in FIG. 3A and FIG. 3B), the Firewall FW_old (corresponding to Firewall 312 in FIG. 3A and FIG. 3B), the Firewall FW_new (corresponding to Firewall 313 in FIG. 3A and FIG. 3B) and the Firewall FW_SEG (corresponding to Firewall SEG 315 in FIG. 3A and FIG. 3B) is shown.

After the IMS-Session has started a Mobility Report is sent from the Home Agent HA to the Firewall Controller. Then, the IMS sends a Session Report to the Firewall Controller. Thereinafter, the Firewall Controller adds a Firewall Rule to the Firewall FW_old and to the Firewall FW_SEG. Hence, traffic is legitimate between the Correspondent Node CN 317 and the User Equipment UE 309 through Firewalls 315, 312 and 313 (see FIG. 3A and FIG. 3B).

After a while, the User Equipment UE may want to change to a different interface (from 3G to WLAN in the example according to FIG. 3A and FIG. 3B). A handover is performed, the User Equipment UE sends a Binding Update-message to the Home Agent HA, the Home Agent HA forwards a Mobility Report to the Firewall Controller.

The Firewall Controller removes Firewall rules from the Firewall FW_old and adds Firewall Rules to the Firewall FW_new indicating that legitimate traffic is now going between the new Care of Address CoA of the User Equipment UE and the Correspondent Node CN.

In addition, the Firewall Controller updates the existing Firewall Rule in the Firewall FW_SEG indicating that the legitimate traffic that has been going on between the old Care of Address CoA of the User Equipment UE and the Correspondent Node CN is now running between the new Care of Address CoA of the User Equipment UE and the Correspondent Node CN.

A Mobility Report may contain the following information:
Home Address:
the User Equipment's UE Home Address;
Care-of Address (CoA):
the new Care-of Address of the User Equipment UE.

A Session Report may contain the following information:
Command:
"Session_start" or "Session_stop";
Home Address:
the Home Address that identifies the User Equipment UE;
Correspondent Node:
the host the User Equipment UE communicates with;
Source/Destination Ports, Protocol:
information further specifying the packets belonging to the session.

Preferably, the Firewall Controller is provided with a list of mappings between Home Addresses and Care-of Addresses and notified whenever the Care-of Address of a User Equipment UE changes.

For the configuration of Firewalls to external networks, any protocol for the configuration of firewalls can be used, e.g. the MIDCOM protocol. Communication to the Policy Charging Enforcement Functions (PCEF) would be performed with the normal mechanisms for setting, changing and removing Policy and Charging Control-rules, i.e. by using a Common Open Policy Service (COPS) protocol over a Gx reference point.

Figure 5A:
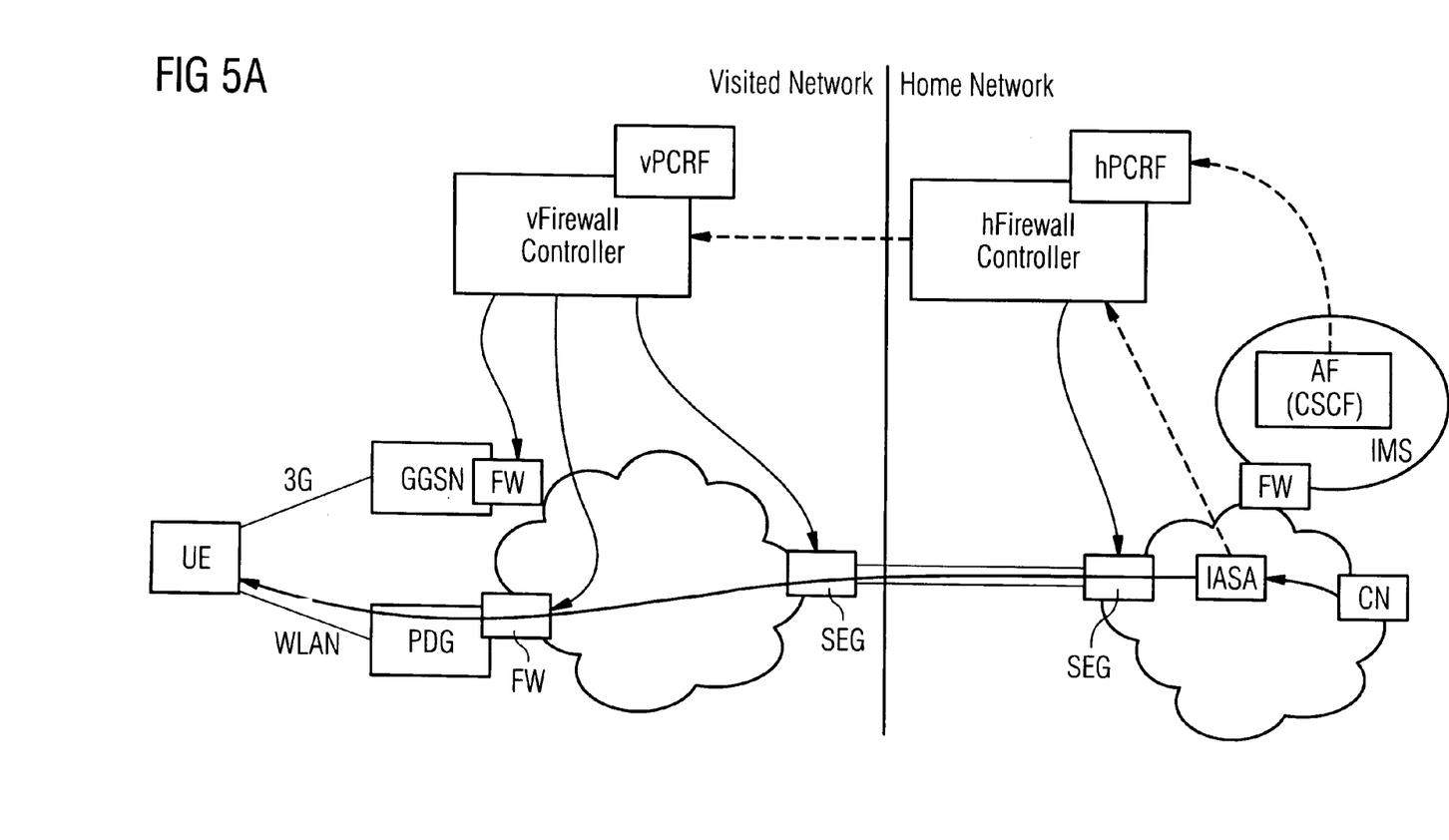
FIG. 5A shows a Firewall Controller in a roaming scenario where the Inter Access System Anchor Point IASA is located in the Home Network.
Figure 5B:
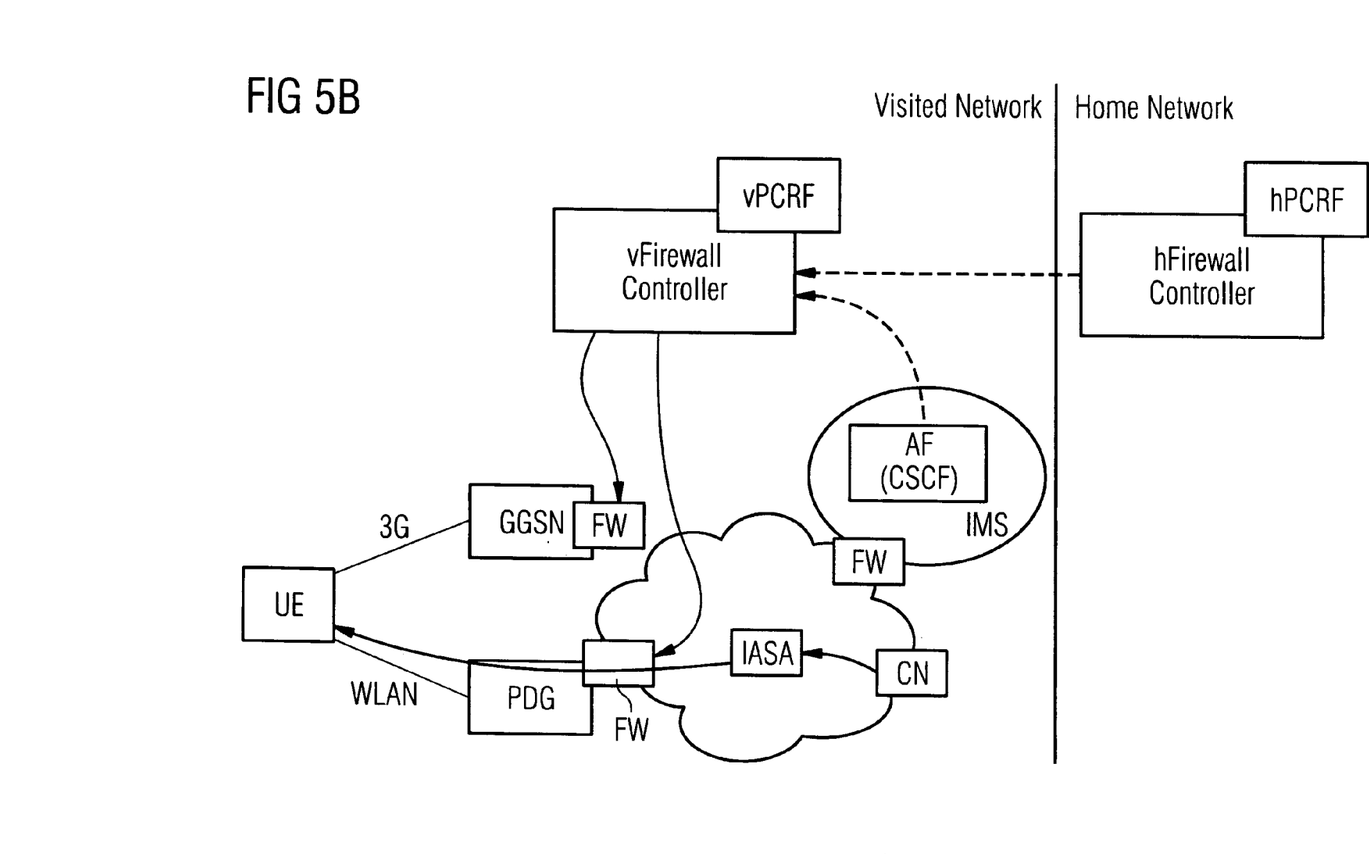
FIG. 5B shows a Firewall Controller in a roaming scenario where the Inter Access System Anchor Point IASA is located in the Visited Network.

Co-locating the Firewall Controller with the Policy Control and Charging Rules Function PCRF can also be provided in case a terminal is roaming to/in a visited network. Reference is made to FIG. 5A and FIG. 5B. The references largely correspond to those given and explained with regard to FIG. 3A and FIG. 3B above.

If the Inter Access System Anchor Point IASA is located in the Home Network as shown in FIG. 5A, the hFirewall Controller in the home Policy Control and Charging Rules Function PCRF will generate the rules that are needed for the firewall configuration service and transfer them to the vFirewall Controller in the visited Policy Control and Charging Rules Function PCRF, which will check them against the security policies of the visited network and configure the Policy Charging Enforcement Function PCEF. Communication between the hFirewall Controller and the vFirewall Controller may take place via a reference point "S9" as described in 3GPP TR23.882.

In a local-breakout case (see FIG. 5B), i.e. if the Access System Anchor Point IASA located in the visited network, the vFirewall Controller in the visited Policy Control and Charging Rules Function PCRF will be responsible for setting the firewall rules. Interaction with the hFirewall Controller in the home network is possible, e.g., if the provider has special security requirements for this user that should always be met, even if the user is roaming.

Figure 6:
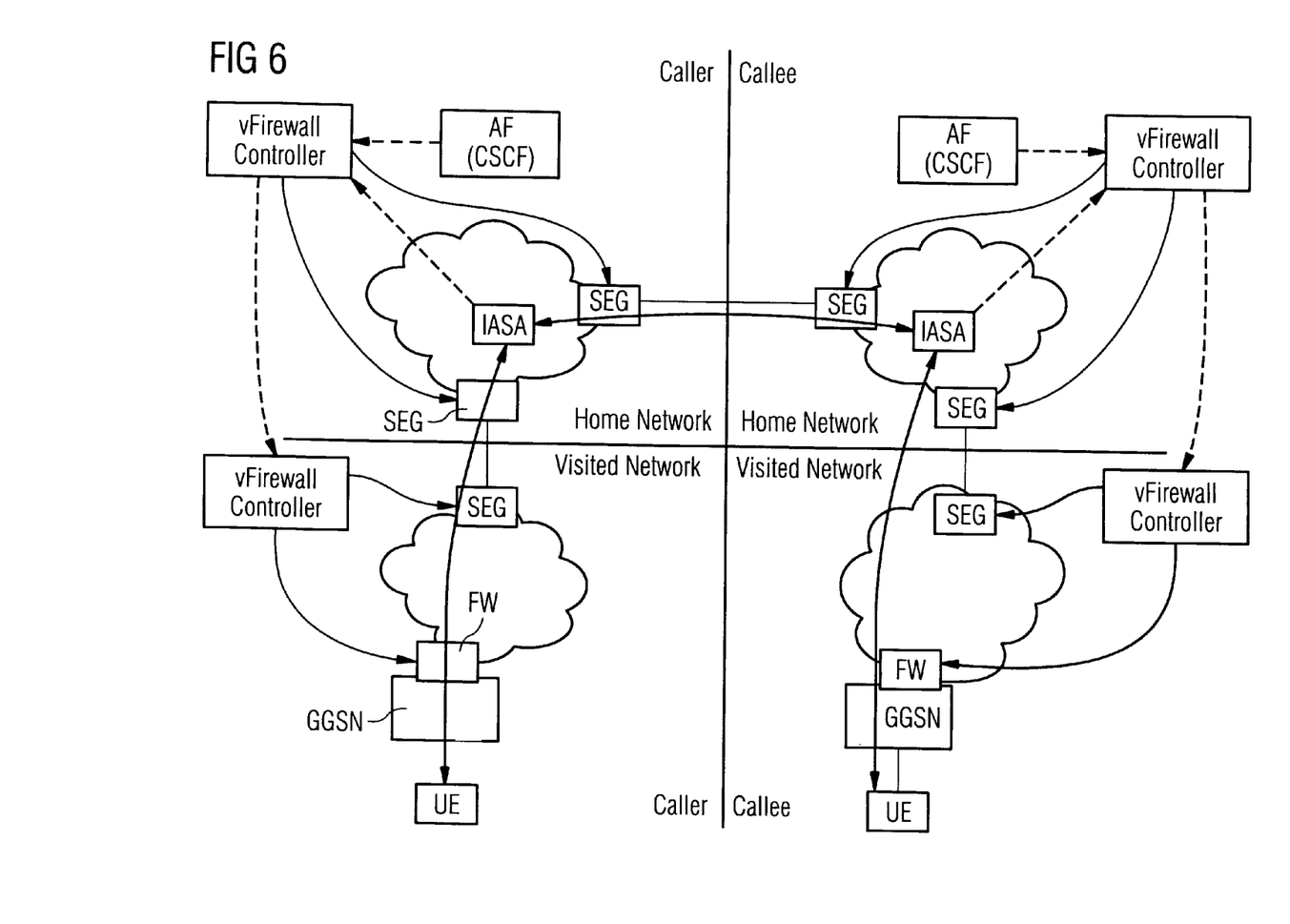
FIG. 6 shows a roaming-case with four networks involved.

FIG. 6 shows a roaming-case with four networks involved. Both, a caller and a callee are roaming in a visited network. The respective Access System Anchor Point IASA is located in the home network (no local breakout) and the traffic is routed via the affected Inter Access System Anchor IASA (no Route Optimization).

As can be seen in FIG. 6, no interaction is necessary between the Firewall Controller on the caller side and the Firewall Controller on the callee side. During session setup there is a Session Initiation Protocol (SIP) based interaction between the Application Function AF (in particular the Call Session Control Function CSCF) which preferably provides the respective Firewall Controller with all information required to configure the firewalls.

Figure 7:
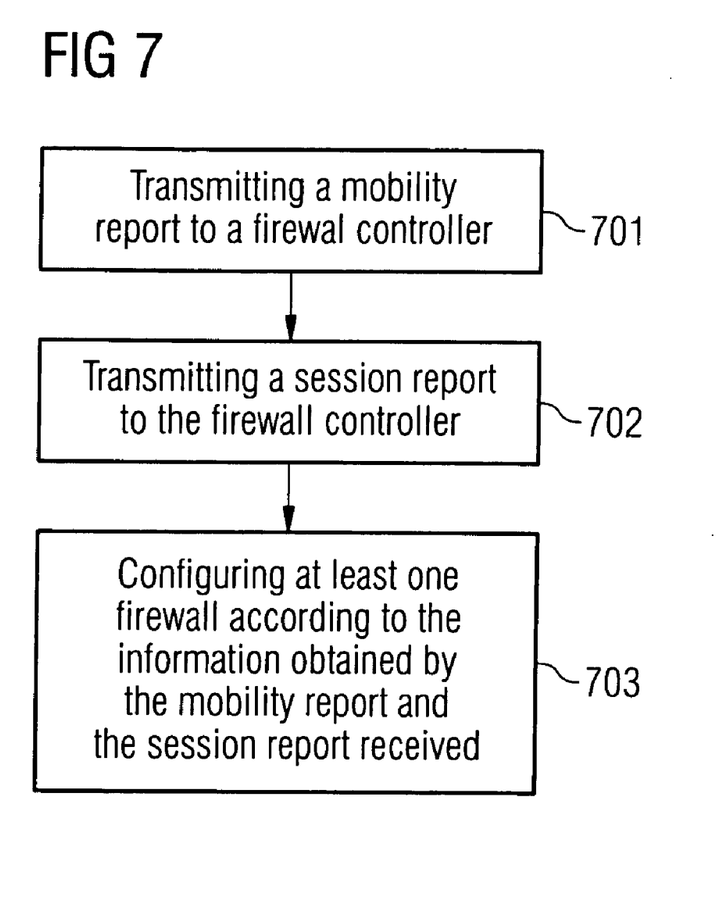
FIG. 7 shows a chart comprising steps of a method for configuring at least one firewall.

In FIG. 7 a chart shows steps of a method for configuring at least one firewall.

In a step 701 a mobility report is transmitted to (and received by) a Firewall Controller. In a further step 702, a session report is transmitted to (and received by) the Firewall Controller. Upon the information received by the transmitted mobility report and the transmitted session report, the Firewall Controller configures at least one Firewall in a step 703.

The approach described herein allows to use Mobile IP for inter access network handover while maintaining session based firewall configuration. Such a method is extremely useful if System Architecture Evolution (SAE) decides to use Mobile IP for inter-system handover.

An alternative solution would be making the Home Agent aware of the Session Initiation Protocol (SIP), i.e. making it a proxy with regard to Session Initiation Protocol (SIP) on the signaling path. Hence, all information required to configure the firewalls will be available and the firewall controller and/or firewall controller function would be included in and/or associated with the Home Agent HA. In such an example, the Firewall Controller, the SIP-proxy and the Home Agent could be grouped together (functionally, logically or from a hardware perspective).

The invention claimed is:

1. A method of configuring at least one firewall comprising:
   receiving at least one mobility report providing information relating to the location of a terminal at a firewall controller;
   receiving at least one session report from an application function of an internet multimedia subsystem at the firewall controller; and
   configuring the at least one firewall according to the information obtained by the firewall controller in the at least one mobility report and in the at least one session report,
   wherein said firewall controller has external interfaces towards said application function of an internet multimedia subsystem, and towards said at least one firewall.

2. The method according to claim 1, wherein the at least one firewall is configured by adding, removing or modifying at least one firewall rule.

3. The method according to claim 1, wherein the firewall controller receives the at least one mobility report from an Inter Access System Anchor.

4. The method according to claim 1, wherein the terminal is a mobile terminal (UE).

5. The method according claim 1, wherein the at least one mobility report comprises information due to roaming of a terminal.

6. The method according to claim 1, wherein the at least one session report provides information about a new session.

7. The method according to claim 6, wherein the at least one session report contains information due to roaming of a terminal.

8. The method according to claim 1, wherein the firewall controller receives the at least one session report from an application function of communication networks comprising a Call Session Control Function (CSCF).

9. The method according to claim 1, wherein the at least one firewall is part of a 3GPP access gateway comprising a GGSN and/or a WLAN access gateway, or part of a 3GPP security gateway.

10. The method according to claim 1, wherein the method is performed by the firewall controller.

11. The method according to claim 10, wherein the firewall controller is a network component comprising a firewall controller functionality.

12. The method according to claim 11, wherein the firewall controller functionality is part of or associated with a Policy Control and Charging Rules Function (PCRF).

13. A firewall controller, comprising:
   a receiver configured to receive at least one mobility report providing information relating to the location of a terminal and at least one session report from an application function of an internet multimedia subsystem;
   a processor configured to configure at least one firewall based on information received in the at least one mobility report and in the at least one session report,
   a first interface towards said application function of an internet multimedia subsystem, and
   a second interface towards said at least one firewall.

14. The device according to claim 13, wherein the device is associated with or part of a Policy Control and Charging Rules Function (PCRF).

15. The device according to claim 13, wherein the at least one firewall is configured by adding, removing or modifying at least one firewall rule.

16. The device according to claim 13, wherein the receiver receives the at least one mobility report from an Inter Access System Anchor.

17. The device according to claim 13, wherein the terminal is a mobile terminal (UE).

18. The device according to claim 13, wherein the at least one mobility report comprises information due to roaming of a terminal.

19. The device according to claim 13, wherein the at least one session report provides information about a new session.

20. The device according to claim 19, wherein the at least one session report contains information due to roaming of a terminal.

21. The device according to claim 13, wherein the receiver receives the at least one session report from an application function of communication networks comprising a Call Session Control Function (CSCF).

22. The device according to claim 13, wherein the at least one firewall is part of a 3GPP access gateway comprising a GGSN and/or a WLAN access gateway, or part of a 3GPP security gateway.

23. A communication system comprising the device according to claim 13.

* * * * *